3,143,520
5-ALKOXYISOPHTHALIC ACID POLYESTERS AND VULCANIZATES THEREOF

Robert A. Hayes, Cuyahoga Falls, Ohio, assignor to The Firestone Tire & Rubber Company, Akron, Ohio, a corporation of Ohio
No Drawing. Filed Jan. 19, 1961, Ser. No. 83,636
5 Claims. (Cl. 260—40)

This invention relates to 5-alkoxyisophthalic acid polyesters, and particularly the flexible, linear polyesters, and their vulcanizates.

It is known that the introduction of phenylene groups into polymers results in improved stability, but usually polyesters obtained by this procedure are hard and brittle, rather than soft and flexible. It has now been found that by introducing 5-alkoxyisophthalate groups into a polyester, heat stability is obtained with improvement in the elastomeric nature of the polyester. More or less 5-alkoxyisophthalic acid can be used, such as, for example, from about 10 percent up to 100 percent, based on the weight of the dibasic acid employed in the formation of the polymer.

5-n-pentoxyisophthalic acid is preferred for this purpose, or, more generally, an alkoxyisophthalic acid containing 4 to 6 carbon atoms in the alkoxy group, although the alkoxy group can contain as many as 18 carbon atoms. These higher 5-alkoxyisophthalic acids are new compounds. The following are illustrative:

5-n-butoxyisophthalic acid
5-n-hexoxyisophthalic acid
The 5-butoxyisophthalic acids
The 5-pentoxyisophthalic acids
The 5-hexoxyisophthalic acids
The 5-decoxyisophthalic acids
The 5-dodecoxyisophthalic acids
The 5-octadecoxyisophthalic acids The dialkyl esters of these compounds are new, including particularly those in which the alkyl group contains 1 to 20 carbon atoms of which the following are listed as illustrative:

Dieicosyl 5-octadecoxyisophthalate
Diestearyl 5-n-butoxyisophthalate
Dimethyl 5-n-decoxyisophthalate
Diethyl 5-n-octoxyisophthalate
Di-n-propyl 5-t-butoxyisophthalate
Dipropyl 5-n-hexoxyisophthalate
Di-t-octyl 5-n-pentoxyisophthalate
Di(2-ethyl-hexyl)-5-(1-pentoxy)-isophthalate
Di-n-nonyl-5-(2-pentoxy)-isophthalate
Di-n-decoxy-5-n-pentoxyisophthalate The elastomers of this invention are polyesters derived from 5-alkoxyisophthalic acid or a mixture of a 5-alkoxyisophthalic acid with other dibasic acids as, for example, 5-hydroxyisophthalic acid, isophthalic acid, terephthalic acid, potassium-3,5-dicarboxybenzene sulfonate, adipic acid, glutaric acid, palmitic acid, sebacic acid, suberic acid, azelaic acid, etc.

Any aliphatic or aromatic diol or other polyol or mixture thereof can be used to prepare polyesters from 5-alkoxyisophthalic acid, with or without other dibasic acids, such as mentioned. These diols include, for example, diethylene glycol, propylene glycol, 1,4-butanediol, butylene glycol, hexamethylene glycol, nonamethylene glycol, decamethylene glycol, butenediol, trimethylol propane, phenylenedioxyethanol, resorcinol, hydroquinone, etc. For flexible polyesters, the preferred glycols are the aliphatic glycols of 3 to 12 carbon atoms. Minor portions of other polyols may be desirable to impart to the polymers certain desirable properties, such as ease of vulcanization, etc. The use of 2–20% by weight of elastomer of m-phenylene dioxydiethanol is particularly advantageous for imparting vulcanizability to the elastomers.

Such polymers containing 5-alkoxyisophthalate groups and containing a small quantity of m-phenylene dioxydiethanol can be vulcanized by formaldehyde (or paraformaldehyde or a polyoxymethylene) or a formaldehyde reaction product of a phenol having at least two reactive positions, such as a hydrocarbon-substituted phenol in which the substituent or substituents are in the 4-position, the 2,5-positions, the 3,5-positions, the 2,4,5-positions or the 3,4,5-positions. A preferred such formaldehyde reaction product is a 2,6-dimethylol-4-hydrocarbon-substituted-phenol, usually a 2,6-dimethylol 4-alkyl phenol, the alkyl group of which contains 1 to 10 carbon atoms. The phenol ring need not be otherwise substituted, but can contain bromine, chlorine, hydroxy, hydroxyalkyl (of 1 to 12 carbon atoms) or alkyl (of 1 to 12 carbon atoms) in one or both of the other positions or elsewhere. The 2,6-dimethylol derivatives of any of the following alkyl phenols, for example, can be used:

4-methylphenol
4-t-octylphenol
4-n-decylphenol
3,4-diethylphenol
3,4,5-tri-n-butylphenol
3-n-nonylphenol
3-n-hexylphenol
3-chloro-4-methylphenol
3,5-dichloro-4-n-hexylphenol
3-methyl-4-chlorophenol
3,5-dibromo-4-ethylphenol
3-bromo-5-ethylphenol
3-ethyl-4-bromophenol
3,5-dihydroxy-4-n-butylphenol
3-hydroxy-4-methylphenol
3-hydroxy-5-methylphenol
3,5-dimethoxy-4-methylphenol
3-decoxy-4-n-octylphenol
3-ethoxy-5-ethylphenol
4-styrylphenol
4-phenylphenol The following examples illustrate the preparation of the 5-alkoxyisophthalic acids and the elastomers and vulcanizates thereof. Although Preparation I relates more particularly to the preparation of 5-alkoxyisophthalic acid, the process employed is useful in the preparation of the other 5-alkoxyisophthalic acids by employing other alkyl halides instead of the pentyl halide of the example.

PREPARATION I

*5-Pentoxyisophthalic Acid*

A 28-oz. bottle was charged with 47 grams dimethyl 5-hydroxyisophthalate, 36.8 grams of n-amyl bromide, 30.4 grams anhydrous potassium carbonate, and 300 ml.

acetone. The bottle was capped and rotated in a water bath at 90° C. for 18 hours. The mixture was allowed to cool and filtered. The inorganic residue was washed with a small amount of acetone. The combined filtrates were evaporated essentially to dryness on a steam bath. A solution of 20 grams sodium hydroxide in 100 ml. water and 100 ml. alcohol was added to the residue and warmed on a steam bath for 1 hour. The resulting solution was poured into 50 ml. concentrated hydrochloric acid and 100 ml. water and filtered hot. The precipitate was slurried with 500 ml. hot water and filtered hot. The 5-n-pentoxyisophthalic acid weighed 43–45 grams (76–80%). It melted at 233–234° C. and had a neutral equivalent of 126–127. The other 5-pentoxyisophthalic acids are similarly prepared using the other amyl bromides.

There are two general methods of preparing the polyesters from 5-pentoxyisophthalic acid. According to one general procedure a dialkyl ester is first produced and then this is reacted with the glycol. The dialkyl esters of the 5-alkoxyisophthalic acids used in such a reaction usually include the methyl and ethyl esters, although it is conceivable that the higher esters may be employed. According to the other method, the acid is reacted with the glycol directly. Examples of both of these general procedures are given below.

PREPARATION II

Dimethyl 5-Pentoxyisophthalate

A 2-liter flask fitted with a reflux condenser was charged with 250 grams 5-pentoxyisophthalic acid, 1500 ml. methanol and 50 grams concentrated sulfuric acid and refluxed overnight. Approximately one-half of the methanol was removed by distillation. The solution was poured into 1 liter of water. The oily layer was separated and the aqueous portion extracted with 500 ml. ether. The extracts were combined with the oily layer and washed with water, then with sodium bicarbonate solution and again with water. The ether portion was dried over calcium sulfate and evaporated to dryness first on a steam bath and finally under reduced pressure. The yield of an easily crystallizable liquid was 248 grams (89%). The melting point is less than 35° C.

PREPARATION III m-Phenylenedioxydiethanol

A mixture of 220 grams resorcinol, 264 grams ethylene oxide and 2 grams N-methylmorpholine was charged to a polymerization bottle which was then capped and shaken at 75° C. for 18 hours. The resulting viscous solution was stripped under reduced pressure at 80° C. for 2 hours. The yield was 460 grams. The product gave a negative test for resorcinol. It is presumably a mixture of m-phenylenedioxydiethanol and its monohydroxyethyl ether. It was used without further treatment. The product was used in the preparation of the elastomer described in Examples III, IV, V and VI. Alternatively, pure or commercially pure m-phenylenedioxydiethanol can be used.

EXAMPLE I

Polyethylene 5-Pentoxyisophthalate

A test tube with a side arm was charged with 2.5 grams 5-pentoxyisophthalic acid and 4 ml. ethylene glycol. A slow stream of nitrogen was passed through the solution as it was heated to 180° C. for 24 hours. At the end of this time the temperature was increased to 220° C. and some of the excess ethylene glycol was removed by distillation. A small amount of antimony trioxide was added and the solution was heated at 260° C. under reduced pressure for 6 hours. The resulting polymer was flexible at room temperature but not elastomeric.

The corresponding trimethylene ester was prepared in an identical manner. The resulting polymer was elastomeric although it stiffened considerably in cold water.

EXAMPLE II

Polyhexamethylene 5-Pentoxyisophthalate

This polymer was prepared from hexamethylene glycol, as described above for the ethylene and trimethylene glycol polymers. The product was a soft elastomer of high molecular weight. It did not stiffen appreciably in cold water. A small sample of it was heated in an open flask for 18 hours at 260° C. It lost only 2 percent in weight and showed only very slight surface oxidation and degradation under these conditions. This indicates a considerable improvement in heat stability over the adipate polyesters which are completely degraded under these conditions.

EXAMPLE III

Hexamethylene 5-Pentoxyisophthalate and Its Vulcanizate 2 2-liter round-bottom flask fitted with a stirrer, thermometer, nitrogen inlet tube and a condenser set for downward distillation was charged with 4 mols of 5-pentoxyisophthalic acid, 3.88 mols of hexamethylene glycol, 0.16 mol of m-phenylenedioxydiethanol, 4.01 mols of ethylene glycol, 0.25 gram of stannous oxalate, 0.05 gram of lithium acetate, and 0.16 gram of antimony trioxide. The mixture was stirred and heated overnight at 180° C. with a slow stream of nitrogen blowing through. The temperature was raised slowly to 250° C. and held until ethylene glycol had nearly stopped distilling. The pressure was reduced to 3 mm. and heating was continued at 270° C. until no more ethylene glycol could be removed. The polymer presumably contained a very small amount of ethylene units from the ethylene glycol along with hexamethylene units (constituting the major portion of the units from glycol) together with alkylene units from m-phenylenedioxydiethane, in addition to the 5-pentoxyisophthalate units.

The hot, viscous polymer was poured into an aluminum tray and allowed to cool. This polymer was vulcanized by heating with paraformaldehyde in the amounts indicated in the table, using the following formula:

| | Parts by weight |
|---|---|
| Polymer | 100 |
| HAF Black | 30 |
| Span 65[1] | 2 |
| Stannous chloride | 2 |

[1] Span 65 (a product of Atlas Powder Co.) is a reaction product of sorbitol and mannitol with stearic acid.

The amounts of paraformaldehyde indicated in the following table were added, and the mixes were cured at 340° F. for 60 minutes. The physical properties of vulcanizates obtained with different amounts of paraformaldehyde are given. These were all good soft elastomer vulcanizates.

TABLE 1

| | A | B | C |
|---|---|---|---|
| Paraformaldehyde, parts | 2 | 1 | 0.5 |
| Physical Properties: | | | |
| 100% Modulus, p.s.i. | 550 | 600 | 275 |
| Tensile strength, p.s.i. | 1,700 | 1,425 | 1,025 |
| Elongation, percent | 180 | 160 | 210 |

EXAMPLE IV

Copolymer of Potassium 3,5-Dicarboxybenzene Sulfonate, 5-Pentoxyisophthalic Acid With Hexamethylene Glycol and m-Phenylenedioxydiethanol A 28-oz. bottle was charged with 40 grams monopotassium 3,5-dicarboxybenzene sulfonate, 300 ml. of methanol and 1 gram of concentrated sulfuric acid. It was capped and rotated in a water bath at 70° C. for 72 hours. The mixture was allowed to cool and filtered. The precipitate was washed twice with 300 ml. portions of methanol and dried in an oven at 70° C. The yield of potassium 3,5-dicarbomethoxybenzene sulfonate was 39 grams.

Three and eight-tenths grams of the above ester, 70 grams of dimethyl 5-pentoxyisophthalate, 27.9 grams hexamethylene glycol, 5.15 grams m-phenylenedioxydiethanol, 16.3 grams ethylene glycol, and 0.1 gram litharge was charged to a 250-ml. Claisen flask fitted with a fine capillary inlet tube reached to the bottom of the flask. The mixture was heated to 180–220° C. for 24 hours with nitrogen passing through the capillary. At the end of this time no more methanol was coming off, and the mixture was homogeneous. The pressure was reduced to 1 mm. and the heating was continued at 220–230° C. for 7 hours. The hot, viscous liquid was poured on to aluminum foil and allowed to cool. An elastomeric polymer of moderate molecular weight was obtained.

The 3,5-dicarboxybenzene sulfonate in this reaction acts in the same manner as the dimethyl ester of any dicarboxylic acid. The —SO$_3$K group does not enter into the reaction. The properties of a vulcanizate are shown in Table 2.

EXAMPLE V

*Copolymer of 5-Pentoxyisophthalic Acid, Hexamethylene Glycol and m-Phenylenedioxydiethanol*

The preparative procedure for this polymer was identical to that in Example IV, except that the charge consisted of 140 grams dimethyl 5-pentoxyisophthalate, 53.1 grams hexamethylene glycol, 9.9 grams m-phenylene dioxydiethanol, 31 grams ethylene glycol, and 0.1 gram litharge. Properties of a vulcanizate of this polymer are shown in Table 2.

EXAMPLE VI

*Copolymer of 5-Pentoxyisophthalic Acid, 5-Hydroxyisophthalic Acid, Hexamethylene Glycol, and m-Phenylene Dioxydiethanol*

The polymerization procedure is the same as outlined in Example IV. The charge was 70 grams dimethyl 5-pentoxyisophthalate, 3.5 grams dimethyl 5-hydroxyisophthalate, 26.5 grams hexamethylene glycol, 4.9 grams m-phenylenedioxydiethanol, 17 grams ethylene glycol, and 0.05 gram litharge. Properties of a vulcanizate of this polymer are shown in Table 2.

The polymers of Examples IV, V and VI were compounded according to the following formula:

| | Parts by weight |
|---|---|
| Copolymer | 100 |
| Span 65 | 2 |
| Catalin Resin 9495 [1] | 12 |
| Stannous chloride | 2 |

[1] Catalin Resin 9495 (a product of Catalin Corporation) is a condensation product of an alkylated phenol and formaldehyde.

The mix of Example V had an additional two parts of material identified below, and each of the mixes had HAF black added in the amounts indicated in the table. Each of the mixes was cured for 60 minutes at 340° F.

TABLE 2.—VULCANIZATES OF NEW POLYESTER COPOLYMERS

| | Example IV | Example V | Example VI |
|---|---|---|---|
| MDI [1] | | 2 | |
| HAF Black | 50 | 50 | 30 |
| Tensile Properties at 73° F.: | | | |
| Unaged— | | | |
| 100% Modulus, p.s.i. | 800 | 1,175 | 1,400 |
| Tensile, p.s.i. | 950 | 2,475 | 1,575 |
| Elongation, percent | 120 | 180 | 120 |
| Aged 8 Hours at 400° F.— | | | |
| Tensile, p.s.i. | 2,500 | 1,750 | 2,275 |
| Elongation, percent | 40 | 50 | 80 |
| Aged 8 Hours at 450° F.— | | | |
| Tensile, p.s.i. | 2,400 | 1,600 | 2,625 |
| Elongation, percent | 0 | 20 | 60 |
| Aged 300 Hours at 300° F.— | | | |
| Tensile, p.s.i. | 3,850 | 2,900 | 2,850 |
| Elongation, percent | 30 | 60 | 130 |

[1] MDI, methylene-bis (4-phenylisocyanate), was mixed with the copolymer of Example VIII and heated at 125° C. for 16 hours before the rest of the compounding ingredients were added.

The foregoing examples are illustrative and the invention is not limited thereto. Although generally only the alkyl esters of 5-alkoxyisophthalic acids will be used in the preparation of polyesters, the invention includes as new compounds all esters. These are obtainable by conventional methods and include haloalkyl esters (such as chloromethyl, dibromopropyl, etc.), alkenyl esters (such as vinyl, allyl, etc.), polyol esters (such as aminopropylene glycol, etc.), hydroxyalkyl esters (such as hydroxyethyl, hydroxydodecyl, etc.), etc. The polymers are prepared by heating to any suitable temperature up to the boiling point of the lower boiling reactant in the reacting mixture at the pressure employed, to induce and then to regulate the speed of the reaction.

The invention is covered in the claims which follow.

What I claim is:

1. A vulcanizable elastomer which is an ester of (1) a glycol of 3 to 12 carbon atoms, (2) 2 to 20% by weight of the elastomer of m-phenylene dioxydiethanol and (3) a dicarboxylic acid, the dicarboxylate units in the elastomer being 5 to 100 percent (based on the weight of the dicarboxylic acid) of a 5-alkoxyisophthalate containing 4 to 18 carbon atoms in the alkoxy group.

2. A vulcanizate of an elastomer of claim 1 which is the reaction product of the elastomer with a vulcanizing agent of the class consisting of formaldehyde, paraformaldehyde, a polyoxymethylene and condensation products of formaldehyde and a hydrocarbon-substituted phenol having at least two reactive positions.

3. The formaldehyde vulcanizate of an elastomer of claim 1.

4. The vulcanizate of a polymer of claim 1 which is the reaction product of the elastomer with a condensation product of formaldehyde and a 2,6-dimethylol alkylphenol.

5. The process of preparing a vulcanizate which comprises heating 100 parts by weight of the elastomer of claim 1 for substantially 60 minutes at 340° F. with 0.5 to 2 parts of paraformaldehyde and substantially 30 parts of carbon black, 2 parts of a reaction product of sorbitol and mannitol with stearic acid and 2 parts of stannous chloride.

References Cited in the file of this patent

UNITED STATES PATENTS

| 2,885,434 | Cavallini et al. | May 5, 1959 |
| 2,894,934 | Burkhard | July 14, 1959 |
| 2,921,089 | Hagemeyer et al. | Jan. 12, 1960 |
| 2,976,266 | Lytton et al. | Mar. 21, 1961 |
| 2,979,486 | Petropoulos | Apr. 11, 1961 |

UNITED STATES PATENT OFFICE
CERTIFICATE OF CORRECTION

Patent No. 3,143,520                      August 4, 1964

Robert A. Hayes

It is hereby certified that error appears in the above numbered patent requiring correction and that the said Letters Patent should read as corrected below.

Column 4, line 21, for "2 2-liter" read -- A 2-liter --.

Signed and sealed this 12th day of January 1965.

(SEAL)
Attest:

ERNEST W. SWIDER
Attesting Officer

EDWARD J. BRENNER
Commissioner of Patents